United States Patent
Gillette et al.

(10) Patent No.: US 6,387,430 B1
(45) Date of Patent: May 14, 2002

(54) FOOD PREPARATION AND PACKAGING PROCESS

(75) Inventors: Thomas D. Gillette, Burley, ID (US); L. Jay Andersen, Logan, UT (US); Mikhail Goldenshtein, Marina Del Rey, CA (US)

(73) Assignee: Purely Supreme Foods, LLC, Burley, ID (US)

( * ) Notice: Subject to any disclaimer, the term of this patent is extended or adjusted under 35 U.S.C. 154(b) by 0 days.

(21) Appl. No.: 09/363,253

(22) Filed: Jul. 28, 1999

Related U.S. Application Data

(60) Provisional application No. 60/121,416, filed on Feb. 23, 1999.

(51) Int. Cl.[7] .............................. A23L 3/00; B65B 55/00
(52) U.S. Cl. ...................... 426/520; 426/521; 426/523; 426/407
(58) Field of Search ................................ 426/403, 404, 426/407, 509, 510, 523, 520, 521; 422/33, 295, 306

(56) References Cited

U.S. PATENT DOCUMENTS

| | | | |
|---|---|---|---|
| 2,948,620 A | * 8/1960 | Ashley | 426/311 |
| 3,607,312 A | * 9/1971 | Ready | 426/393 |
| 3,800,778 A | * 4/1974 | Lohr et al. | 126/369 |
| 4,059,919 A | * 11/1977 | Green | 47/1.1 |
| 4,340,613 A | * 7/1982 | Moore | 426/456 |
| RE31,513 E | * 1/1984 | Glen | 426/521 |
| 4,636,395 A | 1/1987 | Robinson, Jr. et al. | 426/511 |
| 4,933,411 A | 6/1990 | Gifford | 426/399 |
| 4,968,516 A | * 11/1990 | Thompson | 426/233 |
| 5,008,123 A | 4/1991 | Bewley et al. | 426/509 |
| 5,101,714 A | * 4/1992 | Grandi | 99/355 |
| 5,235,903 A | * 8/1993 | Tippmann | 99/331 |
| 5,279,212 A | 1/1994 | Coupe | 99/330 |
| 5,284,085 A | 2/1994 | Palm | 99/348 |
| 5,715,743 A | * 2/1998 | Goddard | 99/403 |
| 5,767,487 A | * 6/1998 | Tippmann | 219/440 |

FOREIGN PATENT DOCUMENTS

| | | | |
|---|---|---|---|
| JP | 11004760 | 12/1999 | A47J/27/16 |
| WO | 96/02146 | * 2/1996 | A23B/7/01 |

* cited by examiner

*Primary Examiner*—Nina Bhat
(74) *Attorney, Agent, or Firm*—Ormiston & McKinne

(57) ABSTRACT

Processing techniques for preserving and packaging foods with an extended shelf life that helps overcome the shortcomings of conventional processes. The invention includes four basic innovations—(1) performing the steam cooking and subsequent cooling steps in the same vessel, (2) evacuating the vessel before steam is introduced for cooking, (3) introducing steam into the vessel while the vessel is still under vacuum, and (4) vacuum cooling the cooked food. Accordingly, in one embodiment of the invention, the process includes the steps of placing a food product in a vessel, cooking the food product in the vessel with steam and then cooling the cooked food product in the same vessel without exposing the food product to cooling water or other potential sources of external contamination.

24 Claims, 2 Drawing Sheets

FOOD PREPARATION AND PACKAGING PROCESS

CROSS REFERENCE TO RELATED APPLICATIONS

This application claims subject matter disclosed in the now abandoned provisional application Ser. No. 60/121,416 filed Feb. 23, 1999.

FIELD OF THE INVENTION

The present invention relates generally to food processing and, more particularly, to prolonging the shelf life of meats and vegetables through a process that includes vacuum steam heating and cooling followed by inert atmosphere packaging.

BACKGROUND

Food processing transforms perishable vegetable and meat products into stable forms that can be stored and shipped to markets without loss of nutritive value or palatability. By using processed foods, consumers gain access to a more diversified diet throughout the year and avoid significant preparation times associated with cleaning, trimming, and cooking fresh foods. While processed foods, particularly canned and frozen foods, can be stored without spoiling for much longer periods than fresh foods, they often exhibit less satisfactory flavor, texture, color, and nutritional value. Canned and frozen food manufacturing practices may compromise these and other organoleptic attributes.

There is growing demand in the retail sector for extended shelf life foods that are convenient to prepare but that maintain the favorable qualities of fresh vegetable and animal meat products. Consumers prefer the favorable sensory characteristics of taste, texture, and color associated with fresh foods, but want the ease of using foods with reduced preparation times. Extended shelf life foods must conform to sterilization regulations as directed by food safety laws, meet manufacturing requirements including extended shelf life and low production cost, and satisfy consumer quality and convenience expectations. However, food processing techniques based on distinct heating, cooling, and packaging operations exhibit mixed success in achieving these objectives. Processes that rely on hot water to blanch or heat vegetable or animal meat products may reduce microorganisms and inhibit certain enzymes associated with food spoilage, but they frequently significantly diminish favorable food qualities such as flavor, texture, color, and nutritional value. Blanching or related hot water treatments additionally may lead to formation of large quantities of wastewater. The use of large quantities of water may require additional production steps and contribute to increased production costs. Processes that rely on water baths or sprays to cool the heat treated vegetable or animal meat products also may lead to formation of large quantities of wastewater and they create added risk of re-exposing partially processed foods to contaminants.

There remains a need for a cost effective food processing method that produces vegetables and animal meats that are safe to consume, possess favorable organoleptic qualities, and have extended shelf lives.

SUMMARY

The present invention is directed to processing techniques for preserving and packaging foods with an extended shelf life that helps overcome the shortcomings of conventional processes. The invention includes four basic innovations—(1) performing the steam cooking and subsequent cooling steps in the same vessel, (2) evacuating the vessel before steam is introduced for cooking, (3) introducing steam into the vessel while the vessel is still under vacuum, and (4) vacuum cooling the cooked food.

Accordingly, in one embodiment of the invention, the process includes the steps of placing a food product in a vessel, cooking the food product in the vessel with steam and then cooling the cooked food product in the same vessel without exposing the food product to cooling water or other potential sources of external contamination.

In a second embodiment, the process includes the steps of placing the food product in the vessel, removing substantially all of the air from the vessel, cooking the food product, and then cooling the cooked food product.

In a third embodiment of the invention, the process includes the steps of placing the food product in the vessel, creating a vacuum in the vessel, introducing steam into the vessel while the vessel is still under vacuum, cooking the food product and then cooling the food product.

In a fourth embodiment, the process includes the steps of placing the food product in the vessel, cooking the food product, and then cooling the cooked food product by vaporizing residual moisture left in the vessel after cooking, including any moisture on or in the food product.

The cooked and cooled food products will typically be unloaded from the vessel to a clean room where they are packaged in sealed containers to prevent microbial recontamination. The processing techniques of the present invention give rise to vegetable or animal meat products with extended shelf lives of up to 45 days if shipped and stored in an environment cooled to 33° F.–34° F. These processes employ vacuum steaming and cooling techniques that are new and more desirable treatment steps than those processes disclosed in the prior art because they maintain high levels of food sterilization and extended shelf life without significantly impairing food sensory qualities that are favored by consumers. In addition, by using a vessel for both the heating and cooling steps, the processes of the present invention reduce the number of processing steps and minimize the need to change production lines or equipment, lowering production costs for manufacturers and minimizing the risk of exposing partially processed foods to contaminants.

The invention, as summarized above and defined in the claims at the end of this Specification, may be better understood with reference to the drawings and the following detailed description of the preferred embodiment and appended claims.

DESCRIPTION

Figure 1:
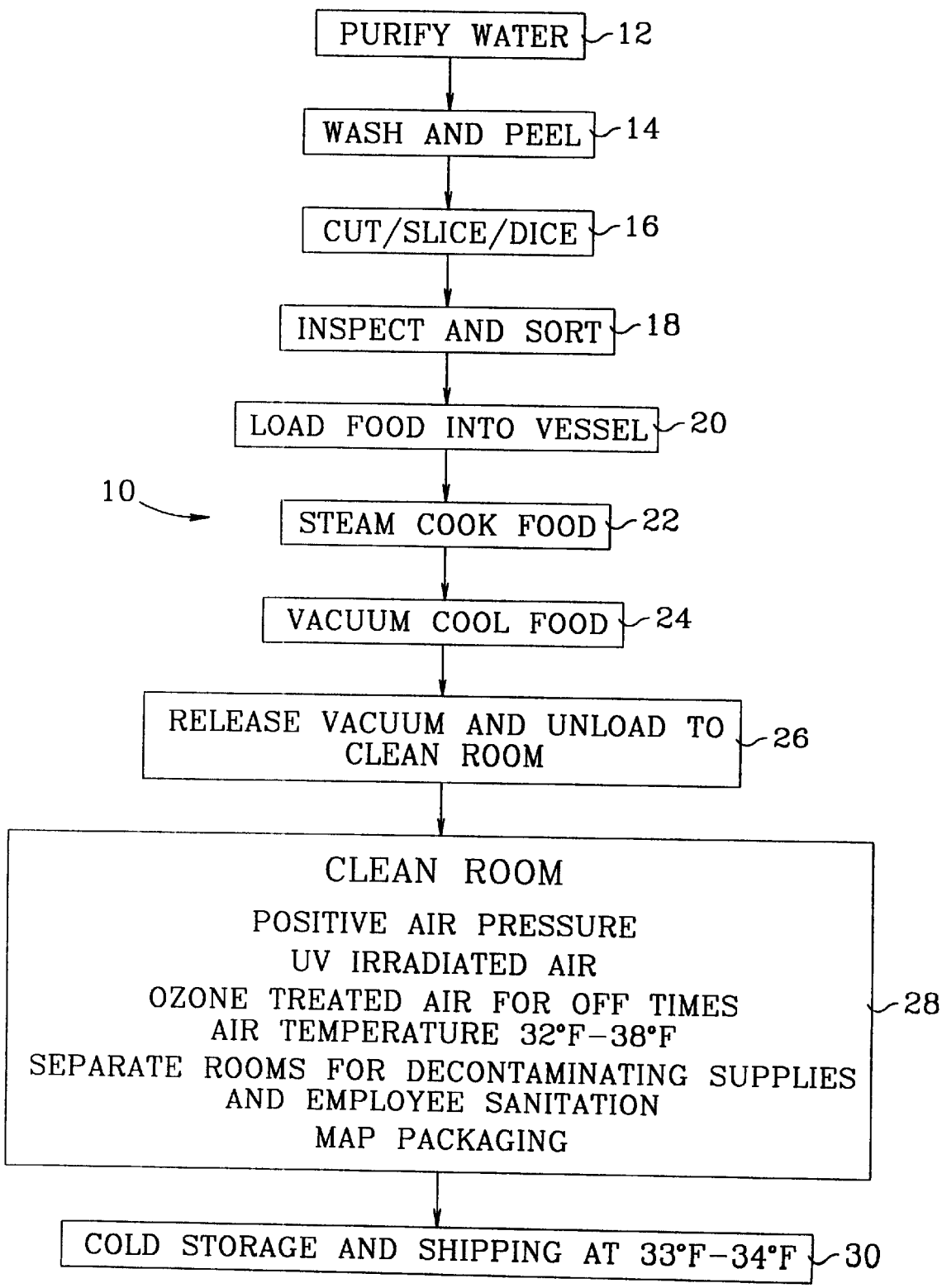
FIG. 1 is a high level flow diagram illustrating one embodiment of the overall food preparation and packaging process of the present invention.

The invention will be described with reference to the preparation and packaging of potatoes using the steps illustrated in FIGS. 1 and 2. The invented process, however, is not limited to potatoes. The process may be used with any kind of food, including but not limited to: carrots; cauliflower; sugar peas; broccoli; potatoes; asparagus; beef pieces; pork chops; marinated or seasoned whole chickens and turkeys; and fish filets of trout, salmon, or halibut. Potatoes are used in the following description for illustrative purposes only.

The overall preparation and packaging process, indicated generally by reference number 10, will be described first with reference to the high level flow diagram of FIG. 1. The details of the cooking and cooling steps will then be described with reference to FIG. 2. Referring to FIG. 1, the potatoes are prepared for cooking in steps 12–18 using conventional techniques and equipment well know to those skilled in the art of food processing. Potatoes entering the processing plant are cleaned with purified water or steam and then peeled, if necessary, in step 14. All water used in the process, including the water used to make steam, is purified by membrane filtration, ozonation, chlorination, ultraviolet light irradiation or any other suitable purification technique as indicated by step 12 in FIG. 1. Using purified water minimizes bacterial contamination from the beginning of the manufacturing process. Any defects in the potatoes are removed and the raw potatoes are cut or sized and sorted, where necessary or desired, as indicated by steps 16 and 18.

The potatoes are then placed into a vessel, which is often called a "retort" in the food processing industry, for cooking and cooling as indicated by step 20. The potatoes may be loaded into baskets, carried on a single or tiered conveyor or placed on shelves to facilitate even cooking. The particular device used to hold the potatoes in the vessel is not important to the invention except to the extent the device should allow the potatoes or other food products to be arranged in a single layer or other configuration that promotes even cooking. Once the potatoes are loaded into the vessel, the vessel is sealed and evacuated and steam is introduced into the vessel to cook the potatoes as indicated in step 22. Then, the potatoes are vacuum cooled in step 24.

After the potatoes are cooled, the vacuum is released from the vessel and the potatoes are unloaded into a clean room for packaging as indicated in step 26. A clean room is an environmentally controlled area used to prevent bacterial contamination of the food products. One exemplary set of parameters for clean room operations is shown in step 28 of FIG. 1. The room is pressurized. The air is irradiated with ultra-violet light during working hours and circulated through the clean room at approximately six air changes per hour. The air is treated with ozone during non-working hours. The temperature in the clean room is kept between 32° F.–38° F. Preferably, separate rooms adjoining the clean room are provided used for decontaminating supplies and employee sanitation. Individual packages of the food are evacuated, flushed with an inert gas or combination of inert gases with a preselected mixture of $O_2$, $CO_2$, and $N_2$, and rapidly sealed. The flushing gas is selected to provide optimum levels of $O_2$ and $CO_2$ (with a balance of $N_2$) to immediately reduce the respiration rate of the particular produce or animal meat product. MAP (Modified Atmosphere Packaging) packaging as this packaging process is often called, which is well known in the food processing industry, is desirable to prevent recontaminating the cooked food.

In step 30, the packaged vegetable and/or meat product is placed and cold storage and then shipped, preferably, at a temperature between 33° F.–34° F.

Figure 2:
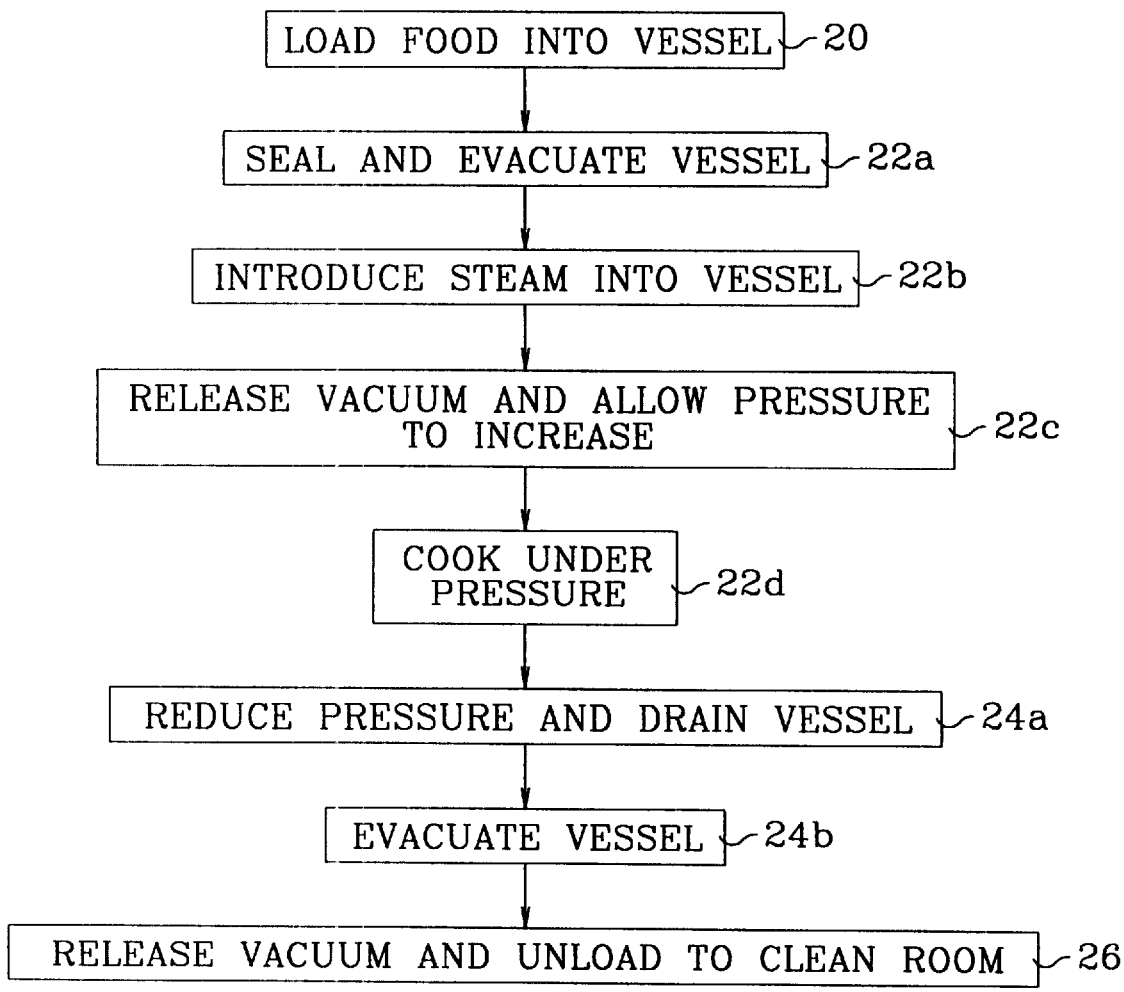
FIG. 2 is a flow diagram detailing the cooking and cooling steps in the process of FIG. 1.

Referring now to FIG. 2, after the vessel is loaded with potatoes in step 20, the vessel is evacuated to a pressure of about 29.5" Hg gauge. Evacuating the vessel removes air and water vapor that, if it were allowed to remain in the vessel as in conventional processes, can act as a thermal barrier that inhibits even cooking. Next, in step 22*b,* steam is introduced into the vessel while the vessel is still under a vacuum. Introducing the steam while the vessel is still under vacuum allows any surface moisture or other residual condensate and any condensate in the steam to vaporize as the temperature starts to rise. As the temperature in the vessel increases, the vacuum is released and the vessel is pressurized as indicated in step 22*c.* Some steam may be vented, as necessary, to facilitate heat exchange in the vessel. In step 22*d,* the potatoes are cooked under pressure for a predetermined time to achieve the desired texture. Although the pressure in the vessel will vary depending on the desired cooking temperature, the type of food being cooked and the degree to which the food is partially or fully cooked, it is expected that a pressure of about 1–5 psi will be suitable for most foods.

After the food is cooked, the pressure is released and any condensate is drained from the vessel as indicated in step 24*a.* In step 24*b,* the pressure in the vessel is again reduced to 29.5" Hg gauge to cool the potatoes to 33° F.–37° F. Cooling occurs through the process of water vaporization—any residual moisture in the vessel including moisture left on and/or in the potatoes is vaporized. Transforming this moisture from the liquid state to its gaseous (or vapor) state requires energy, or heat. As the pressure is reduced in the vessel, the temperature at which water vaporizes is reduced. As water in the potatoes changes from a liquid to a gas, it acquires heat from the potatoes. Thus, cooling the potatoes. After the potatoes have cooled, the vacuum is released and the potatoes are unloaded to the clean room in step 26.

One advantage of cooling the potatoes under a vacuum in step 24*b* is the destruction of pathogens and inactivation of enzymes through rapid pressure reduction. As the pressure is reduced in the steam-heated vessel, water within bacteria cells will vaporize, causing the cells to rupture. Another advantage is the removal of excess moisture from the product. The removal of water from the food product during cooling reduces the rate of water activity that occurs after packaging. Water activity is the direct migration of water molecules from inside the food product to the outside of the food product. The water molecules bring with them any internally surviving microorganisms and they provide the moisture necessary for the bacterial replication that causes spoilage. The amount of water removed from the food product may be controlled by varying degree of cooling vacuum in the vessel and the length of time the vacuum is maintained. Removing excess moisture from the potatoes helps ensure a safe food product with a high solid to water ratio that makes a tastier more tender potato.

Experimental testing has shown that extended shelf lives up to 45 days are possible using the process of the present invention. The test parameters and results for turkey, salmon and asparagus are summarized below in Tables 1, 2 and 3 respectively. In each case, the food product was washed with purified water, cut to the desired size as noted in the tables, loaded into baskets and placed in the cooking/cooling vessel. The pertinent cooking and cooling parameters are noted in the tables. After the food product was cooled, it was packaged in a clean room as described above for step 28 of FIG. 1.

TABLE 1A

Turkey Pieces (Nominally ¾")

|  | Pressure | Temperature | Time |
|---|---|---|---|
| Introduce Steam Under Vacuum (Steps 22a and 22b) | 29.5" Hg | | |
| Cook (Step 22d) | 1–3 psi | Vessel 195–212° F. Food 199–205° F. | 12–15 min. |
| Cool (Step 24b) | 29.5" Hg | 35° F. | |

TABLE 1B

Turkey Pieces Test Results

| Days Tested | Standard Plate Count (Total Bacteria) | Coliform Bacteria | E-Coli |
|---|---|---|---|
| 1 | 20 | <10 | <10 |
| 8 | 20 | <10 | <10 |
| 10 | 36,000 | <10 | <10 |
| 15 | <10 | <10 | <10 |
| 21 | TNTC | 6,300 | <10 |
| 25 | 30 | <10 | <10 |
| 30 | 370 | <10 | <10 |
| 35 | TNTC | <10 | <10 |
| 44 | 20 | <10 | <10 |

The overall appearance of the turkey pieces was good throughout the test period. There were no off odors and the flavor was good.

TABLE 2A

Salmon Fillet (Nominally 1" thick)

|  | Pressure | Temperature | Time |
|---|---|---|---|
| Introduce Steam Under Vacuum (Steps 22a and 22b) | 29.5" Hg | | |
| Cook (Step 22d) | 5 psi | Vessel 215° F. Food 205–212° F. | 15–18 min. |
| Cool (Step 24b) | 29.5" Hg | 37° F. | |

TABLE 2B

Salmon Fillets Test Results

| Days Tested | Standard Plate Count (Total Bacteria) | Coliform Bacteria | E-Coli |
|---|---|---|---|
| 1 | <10 | 7,540 | <10 |
| 8 | 800 | <10 | <10 |
| 10 | 390 | <10 | <10 |
| 15 | 10 | <10 | <10 |
| 21 | 19,920 | 6,300 | <10 |
| 25 | TNTC | <10 | <10 |
| 30 | TNTC | <10 | <10 |
| 35 | TNTC | <10 | <10 |
| 44 | TNTC | <10 | <10 |

The overall appearance of the salmon fillets was good throughout the test period. There were no off odors and the flavor was good. The fillets were getting dry toward the end of the test period.

TABLE 3A

Asparagus Pieces (Nominally 6" pieces)

|  | Pressure | Temperature | Time |
|---|---|---|---|
| Introduce Steam Under Vacuum (Steps 22a and 22b) | 29.5" Hg | | |
| Cook (Step 22d) | 1–3 psi | Vessel 200–212° F. Food 199–205° F. | 4–8 min. |
| Cool (Step 24b) | 29.5" Hg | 33–38° F. | |

TABLE 3B

Asparagus Pieces Test Results

| Days Tested | Standard Plate Count (Total Bacteria) | Coliform Bacteria | E-Coli |
|---|---|---|---|
| 1 | 1,310 | <10 | <10 |
| 7 | 10 | <10 | <10 |
| 14 | 40 | <10 | <10 |
| 23 | 10 | <10 | <10 |
| 28 | <10 | <10 | <10 |
| 35 | 40 | <10 | <10 |
| 42 | 10 | <10 | <10 |
| 45 | 90 | <10 | <10 |

Based on the testing summarized above, and testing of other foods, it is expected that the processing parameters set forth below for a variety of foods will produce safe flavorful packaged ready to eat foods.

TABLE 4

Carrot Pieces (Nominally ⅝"–1½" pieces)

|  | Pressure | Temperature | Time |
|---|---|---|---|
| Introduce Steam Under Vacuum (Steps 22a and 22b) | 29.5" Hg | | |
| Cook (Step 22d) | 1–3 psi | Vessel 200–212° F. Food 199–205° F. | 4–8 min. |
| Cool (Step 24b) | 29.5" Hg | 33–38° F. | NA |

TABLE 5

Cauliflower Floret (Nominally 2"–3" florets)

|  | Pressure | Temperature | Time |
|---|---|---|---|
| Introduce Steam Under Vacuum (Steps 22a and 22b) | 29.5" Hg | | |
| Cook (Step 22d) | 1–3 psi | Vessel 190–200° F. Food 170–185° F. | 3–6 min. |
| Cool (Step 24b) | 29.5" Hg | 37–38° F. | NA |

TABLE 6

Broccoli Florets (Nominally 1½"–2" florets)

|  | Pressure | Temperature | Time |
|---|---|---|---|
| Introduce Steam Under Vacuum (Steps 22a and 22b) | 29.5" Hg | | |

TABLE 6-continued

Broccoli Florets (Nominally 1½"–2" florets)

| | Pressure | Temperature | Time |
|---|---|---|---|
| Cook (Step 22d) | 1–3 psi | Vessel 190–200° F.<br>Food 170–185° F. | 3–6 min. |
| Cool (Step 24b) | 29.5" Hg | 37–38° F. | NA |

TABLE 7

Chicken Breasts (Nominally ¾"–1½ thick)

| | Pressure | Temperature | Time |
|---|---|---|---|
| Introduce Steam Under Vacuum (Steps 22a and 22b) | 29.5" Hg | | |
| Cook (Step 22d) | 1–3 psi | Vessel 195–212° F.<br>Food 190–205° F. | 8–10 min. |
| Cool (Step 24b) | 29.5" Hg | 33–38° F. | NA |

Although the invention has been shown and described with reference to the foregoing preferred embodiments, various other embodiments, additions and modifications are possible without departing from the spirit and scope of the invention as defined in the following claims.

What is claimed is:

1. A process for cooking a food product, comprising:
placing a food product in a vessel;
removing substantially all of the air from the vessel after placing the food product in the vessel and before cooking the food product;
inserting steam into the vessel while the vessel is still under vacuum,
cooking the food product in the vessel with steam;
cooling the cooked food product in the same vessel without exposing the food product to cooling water or other potential sources of external contamination removing the food product from the vessel; and packaging the food product in a clean room.

2. The process of claim 1, wherein the step of cooling comprises vaporizing moisture in the vessel.

3. The process of claim 1, wherein the step of removing air comprises evacuating the vessel and reducing the pressure in the vessel to about 29.5" Hg gauge.

4. A process for cooking a food product in a vessel, comprising:
placing the food product in the vessel;
inserting steam into the vessel;
vaporizing surface moisture and steam condensate within the vessel;
cooking the food product with steam;
cooling the cooked food product removing the food product from the vessel; and packaging the food product in a clean room.

5. The process of claim 4, wherein the step of vaporizing comprises establishing a vacuum pressure in the vessel before introducing steam, and maintaining the vacuum as steam is introduced.

6. The process of claim 5, wherein the step of establishing a vacuum pressure comprises evacuating the vessel removing substantially all of the air and reducing the pressure in the vessel to about 29.5" Hg gauge.

7. The process of claim 4, wherein the step of cooling comprises vaporizing moisture in the vessel.

8. A process for cooking a food product in a vessel, comprising:
placing the food product in the vessel;
creating a vacuum in the vessel;
inserting steam into the vessel while the vessel is still under vacuum;
cooking the food product;
cooling the cooked food product removing the food product from the vessel; and packaging the food product in a clean room.

9. The process of claim 8, wherein the step of creating a vacuum comprises reducing the pressure in the vessel to about 29.5" Hg gauge.

10. The process of claim 8, wherein the step of cooling comprises vaporizing moisture in the vessel.

11. The process of claim 10, wherein the step of vaporizing comprises reducing the pressure in the vessel to about 29.5" Hg gauge.

12. The process of claim 8, wherein the step of cooking includes releasing the vacuum after steam is introduced into the vessel.

13. The process of claim 8, wherein the step of cooking includes venting steam from the vessel after releasing the vacuum.

14. The process of claim 8, wherein the step of cooking includes releasing the vacuum after steam is introduced into the vessel and then pressurizing the vessel to a pressure of about 1–5 psi.

15. A food preparation and packaging process, comprising:
washing a food product;
placing the food product in a vessel;
removing substantially all of the air from the vessel after placing the food product in the vessel and before cooking the food product;
inserting steam into the vessel while the vessel is still under vacuum;
cooking the food product;
vaporizing moisture in the vessel;
removing the food product from the vessel; and
packaging the food product in a clean room; the clean room having an atmosphere that is:
pressurized;
irradiated with ultraviolet light; and
maintained at a temperature between 32° F. and 38° F.

16. The process of claim 15, wherein the step of washing comprises washing the food with purified water.

17. A food preparation and packaging process, comprising:
washing the food;
placing the food in a vessel;
creating a vacuum in the vessel;
inserting steam into the vessel while the vessel is still under vacuum;
cooking the food product;
cooling the cooked food product;
removing the food product from the vessel; and
packaging the food product in a clean room.

18. The process of claim 17, wherein the step of cooling comprises vaporizing moisture in the vessel.

19. A process for cooking poultry in a vessel, comprising:

placing the poultry in the vessel;

inserting steam into the vessel;

vaporizing surface moisture on the poultry and condensate in the steam;

cooking the poultry with steam at a temperature between 199° F. and 205° F. for between 8 and 15 minutes at a pressure of about 1–3 psi;

cooling the cooked poultry removing the food product from the vessel; and packaging the food product in a clean room.

20. The process of claim 19, wherein the act of vaporizing comprises:

evacuating the vessel to a vacuum pressure before introducing steam;

maintaining the vacuum pressure as steam is introduced; and then releasing the vacuum.

21. A process for cooking fish in a vessel, comprising:

placing the fish in the vessel;

inserting steam into the vessel;

vaporizing surface moisture on the fish and condensate in the steam;

cooking the fish with steam at a temperature between 205° F. and 212° F. for between 15 and 18 minutes at a pressure of about 5 psi;

cooling the cooked fish removing the food product from the vessel; and packaging the food product in a clean room.

22. The process of claim 21, wherein the act of vaporizing comprises:

evacuating the vessel to a vacuum pressure before introducing steam;

maintaining the vacuum pressure as steam is introduced; and then releasing the vacuum.

23. A process for cooking vegetables in a vessel, comprising:

placing the vegetables in the vessel;

inserting steam into the vessel;

vaporizing surface moisture on the vegetables and condensate in the steam;

cooking the vegetables with steam at a temperature between 170° F. and 205° F. for between 3 and 10 minutes at a pressure of between 1 and 3 psi;

cooling the cooked vegetables removing the food product from the vessel; and packaging the food product in a clean room.

24. The process of claim 23, wherein the act of vaporizing comprises:

evacuating the vessel to a vacuum pressure before introducing steam;

maintaining the vacuum pressure as steam is introduced; and then releasing the vacuum.

* * * * *